(12) United States Patent
Hojaji et al.

(10) Patent No.: US 8,414,699 B2
(45) Date of Patent: Apr. 9, 2013

(54) LIGHT WEIGHT ADDITIVE, METHOD OF MAKING AND USES THEREOF

(75) Inventors: Hamid Hojaji, Las Vegas, NV (US);
Caidian Luo, Alta Loma, CA (US);
Liyan Ma, Alta Loma, CA (US)

(73) Assignee: James Hardie Technology Limited, Dublin (IE)

( * ) Notice: Subject to any disclaimer, the term of this patent is extended or adjusted under 35 U.S.C. 154(b) by 733 days.

(21) Appl. No.: 12/104,251

(22) Filed: Apr. 16, 2008

(65) Prior Publication Data
US 2008/0257218 A1 Oct. 23, 2008

Related U.S. Application Data

(60) Provisional application No. 60/923,591, filed on Apr. 16, 2007.

(51) Int. Cl.
*B05D 7/00* (2006.01)
*B32B 5/16* (2006.01)
*B32B 9/00* (2006.01)
*B32B 15/02* (2006.01)
*B32B 17/02* (2006.01)
*B32B 19/00* (2006.01)

(52) U.S. Cl.
USPC ........... 106/672; 106/234; 106/409; 106/605; 106/636; 428/405; 428/406; 427/212

(58) Field of Classification Search .................. 106/235, 106/409, 605, 636, 672; 427/2.14, 212; 428/405, 406
See application file for complete search history.

(56) References Cited

U.S. PATENT DOCUMENTS

| 2,732,397 | A | | 1/1956 | Hull | |
| 3,984,349 | A | * | 10/1976 | Meiller et al. | ................. 502/401 |

(Continued)

FOREIGN PATENT DOCUMENTS

WO   WO 2008131026   10/2008

OTHER PUBLICATIONS

Yuan, P.; Wu, D.Q.; He, H.P.; Lin, Z.Y.. "The Hydroxyl Species and Acid Sites on Diatomite surface: a combined IR and Raman study" [online]. 2004 [Retrieved Jan. 24, 2011]. Retrieved from [http://www.sciencedirect.com/science?_ob=ArticleURL&_udi=B6THY-4B669RC-7&_user=2502287&_coverDate=04%2F15%2F2004&_rdoc=1&_fmt=high&_orig=search&_origin=search&_sort=.*

(Continued)

*Primary Examiner* — Kaj K Olsen
*Assistant Examiner* — Karam Hijji
(74) *Attorney, Agent, or Firm* — Knobbe Martens Olson & Bear, LLP

(57) ABSTRACT

Low density additives and methods of making said additives for composite materials are provided. The low density additives have at least a partial or complete water repellant property that reduces moisture migration, absorption, and retention within a composite material in which it is incorporated into. Active sites are engineered onto the surface of the low density additives to enhance bonding of the additives within a composite matrix. Reduced water movement and enhanced bonding lead to an increased strength and durability performance for a composite material comprising such additives. Composite materials incorporating one or more engineered low density additives as also provided, such composite materials having enhanced strength and durability. Such composite materials may be made from a Hatschek process. The composite materials may be further used as interior and exterior building products.

4 Claims, 10 Drawing Sheets

U.S. PATENT DOCUMENTS

| | | | |
|---|---|---|---|
| 4,346,142 A | | 8/1982 | Lazear |
| 4,415,631 A * | | 11/1983 | Schutijser .................. 428/405 |
| 5,085,784 A * | | 2/1992 | Ostreicher .................. 210/767 |
| 5,244,726 A | | 9/1993 | Laney et al. |
| 5,362,762 A | | 11/1994 | Beshouri |
| 6,074,555 A * | | 6/2000 | Boos et al. .................. 210/198.2 |
| 2007/0072761 A1 | | 3/2007 | Lee et al. |

OTHER PUBLICATIONS

Gonzenbach, Urs T.; Studart, Andre R.; Tervoort, Elena; Gauckler, Ludwig J.."Stabilization of Foams with Inorganic Colloidal Particles"[online]. Nov. 14, 2006 [Retrieved on Jan. 25, 2011]. Retrieved from [http://www.nonmet.mat.ethz.ch/research/speru/publications/03_Stabilization_of_Foams_with_Inorganic_Colloidal_Particles.pdf].*

Canpolat, F.; Yilmaz, K.; Kose, M.M.; Sumer, M.; Yurdusev, M.A.. "Use of zeolite, coal bottom ash, and fly ash as replacement materials in cement production" [online]. 2004 [Retrieved on Jan. 24, 2011]; Retrieved from [http://www.sciencedirect.com/science?_ob=ArticleURL&_udi=B6TWG-482YF74-3&_user=2502287&_coverDate=05%2F31%2F2004&_rdoc=1&_fmt=high&_o.*

Krason, J.; Knud-Hansen, C.F.. "Natural Zeolites-Remedy for Concentrated Animal Feeding Operations and Sustainable Agriculture" [online]. 2004 [Retrieved on Jan. 25, 2011]. Retrieved from [http://www.ramiran.net/index.php?page=ramiran04].*

Yamamoto, Sadaaki; Sugiyama, Shoko; Matsuoko, Osamu; Honda, Tadatoshi; Banno, Yasuyuki; Nozoye, Hisakazu. "AFM imaging of surface of natural heulandite" [online]. 1998 [Retrieved on Jan. 25, 2011]. Retrieved from [http://www.sciencedirect.com/science?_ob=MImg&_imagekey=B6TH4-3VKJJDG-1-1&_cdi=5272&_user=2502287&_pii=S1387181197000127&_origin=search&_co.*

"Engineering Resoures-Bulk Density" [online]. Dec. 18, 2005 [Retrieved on Jan. 24, 2011]. Retrieved from [http://replay.waybackmachine.org/20051218125455/http://www.powderandbulk.com/resources/bulk_density/material_bulk_density_chart_d.htm].*

"Bulk Density and Specific Gravity Chart". ASI. Retrieved on Aug. 18, 2011. Retrieved from http://www.asiinstr.com/technical/Material_Bulk_Density_Chart_S.htm.*

* cited by examiner

US 8,414,699 B2

LIGHT WEIGHT ADDITIVE, METHOD OF MAKING AND USES THEREOF

CROSS REFERENCES TO RELATED APPLICATIONS

This application claims the benefit of U.S. Provisional Application No. 60/923,591 filed Apr. 16, 2007.

BACKGROUND

The description herein relates generally to low density materials for incorporation into composite formulations, and more particularly, to an engineered material that provide very low moisture movement and methods of making such materials.

Composite materials, such as fiber cement, typically incorporate additives to enhance and/or modify material properties. For example, to reduce density, additives, especially porous additives, may be used as density modifiers to reduce the overall density of the composite material when fabricated or in a slurry. The low density property of such additives are, in part, attributed to their foamed, hollow or porous structure. However, pores within such structures do allow for water and moisture absorption as well as water retention and movement.

SUMMARY

Described herein are articles and products with superior moisture control and performance that overcome one or more problems associated with alternative articles and products produced by alternative methods.

Generally, as described are improved low density additives comprising particles having a porous structure with hydroxyl groups deposited on its surface to provide hydrophilic and reactive sites on the surface.

Said additives are prepared as described herein, which includes providing particles having a porous structure and contacting the particles with a chemical to reduce its surface energy, rendering the particle surface hydrophobic.

Composite formulations incorporating the low density additive described herein will be improved, particularly when such low density additive are added in a quantity that lowers the density of the composite material to less than about 1900 kg/m$^3$, and/or in a quantity that maintains moisture expansion of the composite material to a level below about 0.2% and/or in a quantity that accelerates formation of the formulation.

Those skilled in the art will further appreciate the above-noted features and advantages of the invention together with other important aspects thereof upon reading the detailed description that follows and in conjunction with the drawings.

BRIEF DESCRIPTION OF THE DRAWINGS

For more complete understanding of the features and advantages of the invention herein, reference is now made to a description of the invention along with accompanying figures, wherein.

DETAILED DESCRIPTION

Although making and using various embodiments are discussed in detail below, it should be appreciated that as described herein are provided many inventive concepts that may be embodied in a wide variety of contexts. The specific aspects and embodiments discussed herein are merely illustrative of ways to make and use the invention, and do not limit the scope.

Described herein are novel and improved engineered low density materials that may be provided as additives in a composite formulation. Such additives will provide a formulation and the material or article it produces with reduced density, improved moisture performance, and superior matrix bonding strength.

Most composite materials expand and contract due to a change in moisture content in the materials within. For instance, a building product designed for exterior applications, such as a fiber cement fence or a composite wall cladding board, may be exposed to humidity, rain, and freeze and thaw cycles in a cold climate. The moisture (or water) from rain, snow and humidity can migrate through the interior of the material through various physical or chemical mechanisms such as absorption, adsorption, diffusion and other means. Moisture migration into a material will increase the moisture content within the material, thus affecting the weight of the material. The change in weight of the material due to water ingress is referred to herein as water absorption. Water absorption may cause the material to expand or even split in response to the additional stress in the material. This expansion due to moisture migration, reflected in the change in the material dimensions, is referred to herein as moisture expansion. Moisture expansion may be reversible or non-reversible. In a dry or sunny condition, the moisture may dry out, and may cause contraction of the product. Over time, the product may be subjected to many moisture expansion and contraction cycles, which can contribute to product degradation. The ability of a product to withstand varying moisture conditions (and cycles) is referred to as moisture performance of the material. There are many suitable methods for determining moisture performance of a material, including standardized tests, such as ASTM C 1262 freeze-thaw test for manufactured concrete masonry material, or a moisture movement component of the ASTM C 1185 test for fiber cement.

Figure 1:
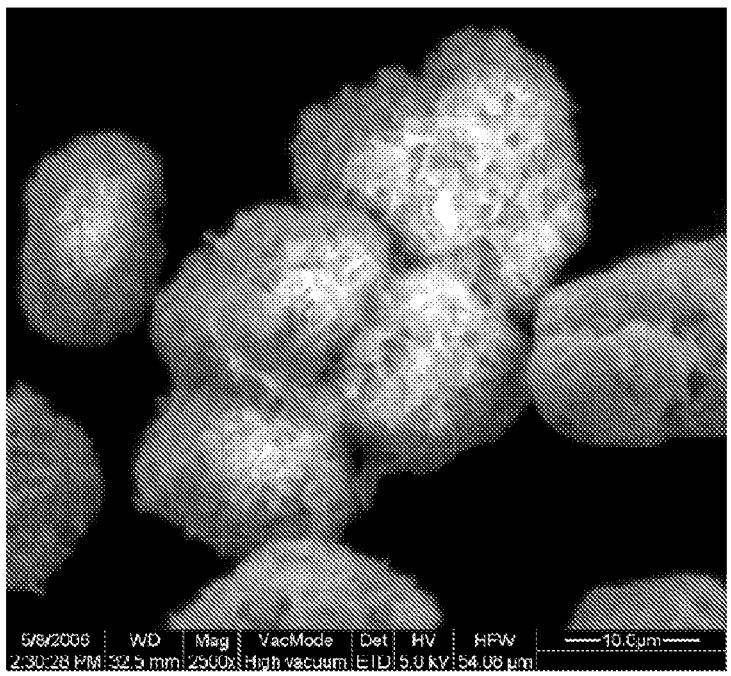
FIG. 1 is an optical image of a representative low density additive described herein.
Figure 2:
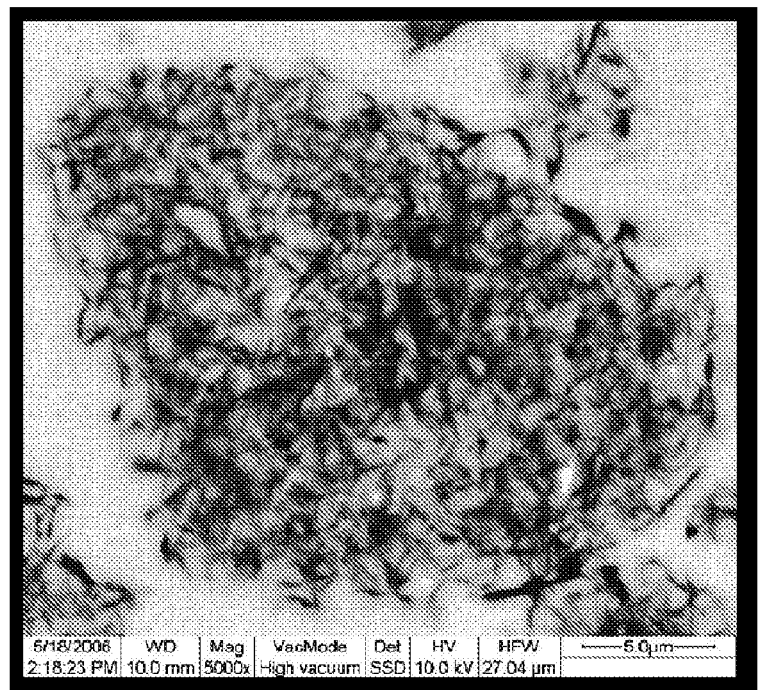
FIG. 2 is a scanning electron microscope (SEM) image of a polished low density additive particle described herein.
Figure 3:
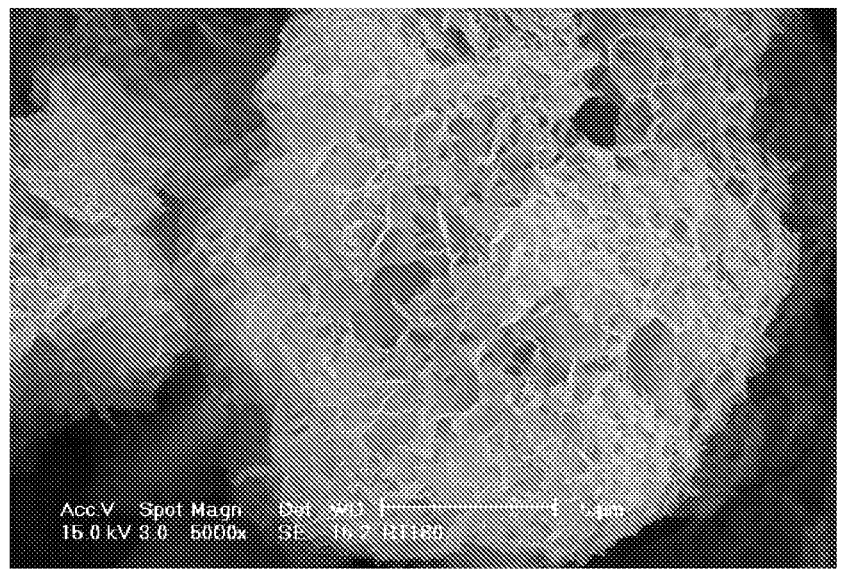
FIG. 3 is an optical image of another representative low density additive described herein.

Many engineered composite materials incorporate density modification additives. Described herein are engineered additives that improve moisture performance of one or more composite materials. The described low density additives have a microstructure resembling that of expanded inorganic aggregates. FIGS. 1 to 3 illustrate various microstructures of additives as observed using SEM. The images show structures that are highly porous, embodying multiple voids, pores, or clusters of non-aligned multi-dimensional crystal micro-plates or micro-needles. Because of the highly porous structure, such additives have a low apparent density and, thus, a low bulk density. The bulk density is preferably in range from about 60 to 1000 $kg/m^3$, preferably from 120 to 800 $kg/m^3$, preferably from 180 to 500 $kg/m^3$, preferably from 200 to 400 $kg/m^3$.

Low density additives as described herein are generally configured as particles or aggregates. In one or more forms, additives described herein may be shaped as a multipoint or rounded edge particle, sphere, elongated particle, flake, aggregate or as an agglomerate of particles, to name a few examples. Additives may also be provided in any such combination of shapes as described. Particles and aggregates are generally nominally about 0.1 μm to 15 mm in size, preferably 10 μm to 10 mm, preferably 12 μm to 1 mm, preferably 15 μm to 600 μm, preferably 30 μm to 580 μm, preferably 35 μm to 300 μm, preferably 50 μm to 250 μm.

Low density additives described herein may be provided in a slurry or paste form wherein such particles or aggregates therein are dispersed, and may also be partially dissolved in a solution. Suitable solutions include water or lime water. Other solutions of normal or alkaline pH are also appropriate. A slurry or paste form may be preferred for each desired application. For example, for use with cementitious composites, additives when in a slurry or a paste may be readily mixed with other components of the cementitious slurry formulation.

The low density additives described herein are generally inorganic in their chemical make-up; however, this not preclude that addition of one or more organic constituents will be provided in some or all of the additives engineered and described herein. The amount of inorganic constituent in a low density additive described herein may be greater than 50 wt %, at or about 60 wt % or greater, at or about 70 wt % or greater, at or about 80 wt % or greater, at or about 90 wt % or greater, and at or about 99 wt % based on the dry mass of the additive.

One or more low density additive embodiments described herein will include an additive engineered to have at least a partial hydrophobic or water repellant property, evidenced by a low wettability, low surface energy and/or various other related parameters. A hydrophobic or water repellant property of an additive described herein reduces moisture movement and thus enhances moisture performance of a composite materials that incorporates such additives as described herein. A low density additive as described herein is also provided with a low surface charge and high zeta potential.

In some embodiments, low density additives are further engineered to include reactive surface sites for form good bonding within a composite matrix. For instance, for cementitious composites, low density additives preferably include surface sites that may impart a hydrophilic property, a positive surface charge, or one or more hydroxyl groups.

The described low density additives are typically made in several parts; the parts include all or portions of: an initial step, in which a low density inorganic material is provided; a surface treatment step, in which the low density inorganic material is rendered hydrophobic or partially hydrophobic; and a reactive or surface activation step, in which reactive sites are introduced onto the surface of a material formed after surface treatment, allowing the additives to bond well within a composite matrix into which the additives are incorporated. The steps described may include on or more preparation steps and may be performed in full or in part, depending on the desired end product. The method described herein is advantageously suitable for a small lab-scale quantity as well as large-scale commercial production.

Referring now to preparation of additives described herein, an initial step (also referred to as step W) provides a low density inorganic material by selecting from one or more porous materials that may include volcanic ash, expanded perlite, pumice, diatomaceous earth, natural zeolite, vermiculite, low-bulk density calcium silicate hydrates, low-bulk density calcium aluminum silicates hydrates, expanded clay, shale, slate, diatomaceous shale, blast furnace slag aggregate and combinations thereof. The low density inorganic material may be formed in nature, for instance by natural volcanic, geothermal or hydrothermal processes or formed synthetically, such as a product formed from a commercial heating and cooling process (e.g., expanded perlite), which may include secondary or by-products of the natural or synthetic processes (e.g., expanded blast furnace slag, fly ash thermally formed into a synthetic aggregate). Low bulk density calcium silicate hydrates, for example, may be formed by reacting a calcareous material with a siliceous material in a hydrothermal condition.

Generally, any inorganic material with a low density, such as that having a foamed or porous structure, may be suitably selected to become the low density inorganic material of step W. Porous inorganic materials are typically chosen to ensure a porous or foamed structure is rigid enough to maintain its form through the treatment process (e.g., additional steps, as described herein) and when incorporated in a composite matrix. A protected and rigid porous structure partakes in the reduction in density of the composite material without significantly reducing material strength. The low density inorganic material may be introduced into the composite material in a number of forms, such as a powder, an aggregate, or in a solution (e.g., as a slurry or paste).

A surface treatment (also referred to as step X) as described herein renders the low density inorganic material hydrophobic or partially hydrophobic by a chemical and/or physical treatment. This step may be carried out by adding a chemical agent or surfactant capable of introducing a hydrophobic property to the low density inorganic material. Suitable chemical agents or surfactants are generally polymers that adsorb to or react with the surface of the porous inorganic material while reducing the surface energy of the porous inorganic material. In one or more embodiments, surface energy reduction is achieved via use of a hydrophobic moiety of a chemical agent or surfactant. For example, hydrophobic moieties, such as hydrocarbon chains orient themselves on the surface and within pores of the low density inorganic material, providing water repellency and rendering the surface of the low density inorganic material hydrophobic. As examples, a chemical agent or surfactant may be chosen from a group of silanes, including monomeric alkyl alkoxy silanes, oligomeric alkyl alkoxy siloxanes or polymeric siloxanes, silicionates, wax, paraffin, and oil or combination thereof. Some low-cost and readily available commercial chemical agents include hydrolyzed n-octyltrithoxysilane, n-octyltrithoxysilane and potassium methyl siloconate. Such agents may self cross-link or be cross-linked with another chemical to improve durability of the hydrophobic surface. Monomeric alkyl alkoxy silanes, oligomeric alkyl alkoxy siloxanes and polymeric silionates are examples. The amount of chemical agent or surfactant added may be from 0.5 to 15 wt %, or from 1 to 10 wt %, or from 2 to 7 wt %, or from 3 to 6 wt %, or from 4 to 5 wt % as compared with the mass of the low density inorganic material on a dry basis.

The surface treatment may be carried out at room temperature or at an elevated temperature. The temperature may be as high as 200° C., and may be between about 10° C. to 70° C., from 25° C. to 55° C., and from 35° C. to 50° C. In addition, a surface treatment step is typically carried out for 15 minutes to 5 hours, from 30 minutes to 3 hours, from 40 minutes to 2 hours, and/or for about 1 hour. It has been found that time and temperature conditions are optimized to keep the chemical agent or surfactant at a sufficiently low viscosity to penetrate into voids of the inorganic material as well as provide enough heat energy for a reaction to occur between the chemical agent or surfactant and the inorganic material. A higher temperature and/or a longer treatment time have been found unexpectedly to increase the hydrophobic property of the treated material. Without being bound by theory, a higher temperature and/or treatment time increases penetration and adhesion of the chemical agent and surfactant through and into the pores of the low density inorganic material, thus increasing its hydrophobic property, especially in pores and voids.

An activation step (also referred to as step Y) introduces reactive sites onto the surface of the material formed by surface treatment using chemical or physical treatment. This treatment portion may be carried out by introducing a compound as an activation agent to the material formed after surface treatment. A suitable activation agent may include one or more oxides or hydroxide, organic salt or inorganic salt of alkali metals (e.g., sodium and potassium), oxide, hydroxide, organic salt or inorganic salt of alkaline earth transition metals (e.g., calcium, scandium, titanium, iron, zinc, aluminum), oxide or gel of silicon and phosphorous, and silicates of alkali metals (e.g., sodium silicate), or combinations thereof. Essentially any oxide, hydroxide, organic salt or inorganic salt of any chemical located in periods 1a, 2a, 3a and 4a of the periodic table may be used as an activation agent. Such compounds may be introduced in any of a number of forms, including a dry powder, in a pre-dispersed form, in a fluid like state, a gel or a solution. Some examples of commercially low-cost and readily available activation agents include colloidal silica gel, alumina powder, quick lime, hydrated lime, and sodium silicate. Without being bound by theory, it is considered that these activation agents either deposit hydroxyl groups or form salts by precipitation or partially remove one or more hydrocarbon chains formed following a surface treatment, thus leaving hydrophilic or reactive sites on the surface of the low density additives.

The amount of activation agent added in the activation step is generally from 1 to 20 wt % and may be from 2 to 15 wt %, or from 3 to 10 wt %, or from 4 to 7 wt % as compared with the mass of the low density inorganic material on a dry basis. Activation as described herein may be carried out at room temperature or at an elevated temperature. The treatment temperature may be as high or higher than 200° C. In some embodiments, the temperature between about 20° C. to 180° C., from about 25° C. to 100° C., from about 35° C. to 80° C. The activation step is typically of a duration from 15 minutes to 5 hours, may be from 20 minutes to 3 hours, from 30 minutes to 2 hours, or for about 40 minutes.

It has been noted that until the additive described herein it has been difficult to incorporate into a composite an additive with at least a partial hydrophobic property. A silane-treated volcanic ash, for example, may serve as a low density and low water movement additive for fiber-reinforced composite, but a fiber-reinforced cement product formed therefrom has a poor modulus of rupture (MOR) and modulus of elasticity (MOE), thus performing poorly once formed, especially as a building product. The low strength appears to be due to a water repellant property of such additives formed previously by others that prevents the forming of strong bonds with a composite matrix, including a cement matrix. The activation step as described herein advantageously overcomes such a bonding problem by introducing reactive sites on the surface of the additives formed herein, allowing strong bonding of the additives described herein within a composite matrix. The engineered low density additives, therefore, as described herein are engineered to have a water repellant property while maintaining strong matrix bonding, thus maintaining a final product strength in a formed matrix.

It has been found that a higher temperature and/or a longer treatment time for the activation step increases reactivity on the surface of the resultant low density additives and reduces the hydrophobic property of the additives formed. In step X, higher temperature and/or longer treatment time was found to increase the hydrophobic property of the low density additives formed therefrom. Accordingly, optimal conditions may be designed to achieve a predetermined final hydrophobic and surface reactive property for formed additives, such pre-determined properties suitable for a specific composite application.

An engineering property for additives described herein may include an intense hydrophobic treatment for specific applications with high cyclic exposure to water and moisture, and therefore with highly durable moisture performance requirement. Such applications may include those for exterior building product use (e.g., siding or fencing) or interior product use in wet areas (e.g., tile underlayment in bathrooms). In addition or as an alternative, additives described herein may be engineered to include only generally mild hydrophobicity, as suited for an application, such as interior use with walls or trimming, where moisture exposure is milder or more constant.

For a low density additive described herein to be provided in a powder or dry form, a drying step may be included after an activation step. Drying may be in the form of thermal spraying or via a pin-mixing process to produce the low density additives in a powder, aggregate or agglomerate form. A powder or dry form may be preferred in some instances, when desiring to have efficient and low cost transportation of the product, as an example.

In some embodiments, step X and step Y are advantageously combined to provide an low density inorganic aggregate with at least a partial hydrophobic property. This may be done, for example, by adding a chemical agent during formation of the low density inorganic material. For instance, a silane may be added during the calcareous and silaceous reaction to form a partially hydrophobic low density calcium silicate hydrate. Combining step X and step Y advantageously increases retention of a hydrophobic chemical agent within the low density structure, and thus improves moisture performance. A combination steps should also eliminate a process step, thus reducing cost.

The novel engineered low density additives may be incorporated in one or more composite formulations, such as a cementitious formulation or articles formed therefrom. Low density additives disclosed herein advantageously contribute to reducing density, increasing moisture performance and maintaining or increasing the strength of the composite material when formed, and accelerating the composite formation time, among other advantages. The engineered low density additives are advantageously incorporated into the composite formulation in a quantity sufficient to lower the density of the composite material to less than about 1900 kg/m$^3$, generally less than 1500 kg/m$^3$, less than 1350 kg/m$^3$, less than 1200 kg/m$^3$, and 1100 kg/m$^3$ or less. The engineered low density additives advantageously maintain moisture expansion of the composite material to a level below about 0.2%, and may be below 0.18%, and below 0.17%.

In one or more embodiments, a composite formulation comprising engineered low density additives described herein is used to form a fiber-reinforced composite article. Such composite articles may be in the form of a panel, board, post, siding, plank, post, container, or other shaped article for buildings or other uses/applications. The composite articles may be used for interior or exterior building applications. Interior building products not exposed to excessive water or moisture (e.g, rain or snow), should have a less stringent requirement for moisture performance of the low density additives, and allowing maximization of its matrix bonding property. Building articles and products may be made herein using a slurry, dewatering process (e.g., Hatschek process), a filter press process or an extrusion process, a moulding process or any other suitable formation process. Generally, a method of making the building article includes providing a hydraulic binder, fiber, water and the low density additive described herein (among other optional additives, included as desired and when appropriate) and forming a green uncured material. The material may be pre-cured for one to several hours or days or simply cured at an elevated temperature (generally in a moist atmosphere). When desired, curing may occur in an autoclave.

Several examples further illustrate embodiments described herein, including methods for the preparation of one or more low density additives.

Figure 4:
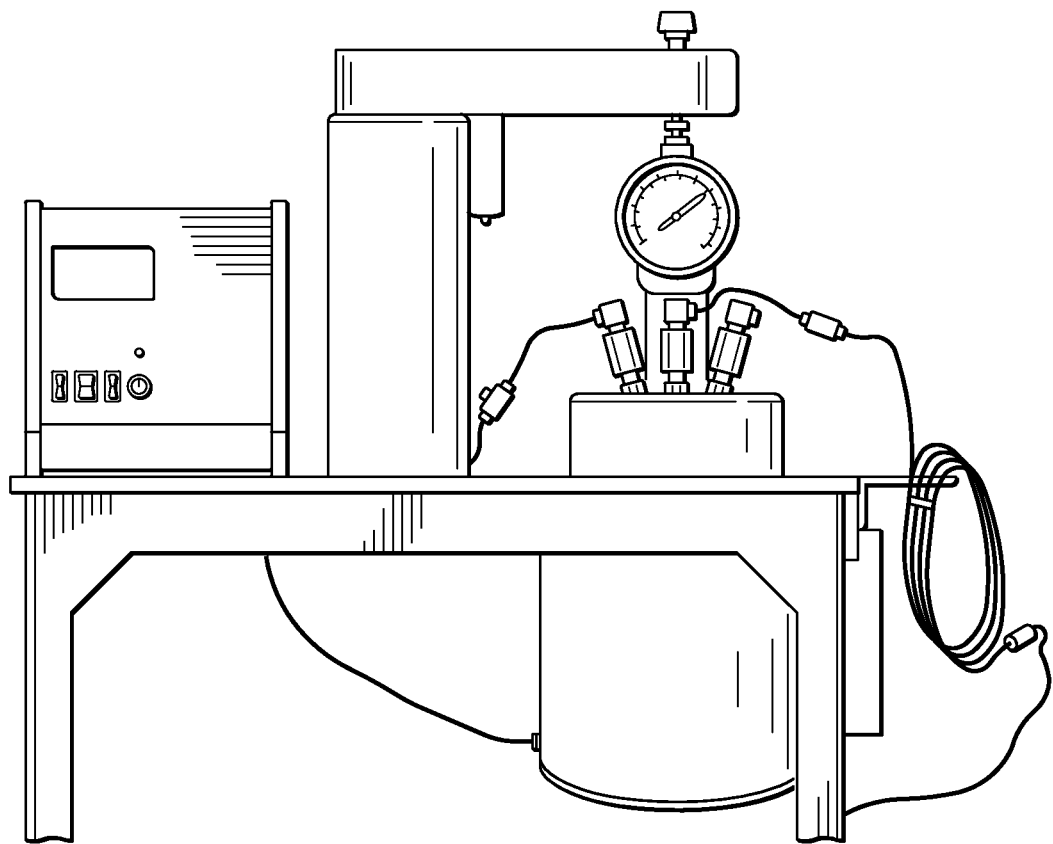
FIG. 4 depicts apparatus for producing a representative low density inorganic material described herein.
Figure 5:
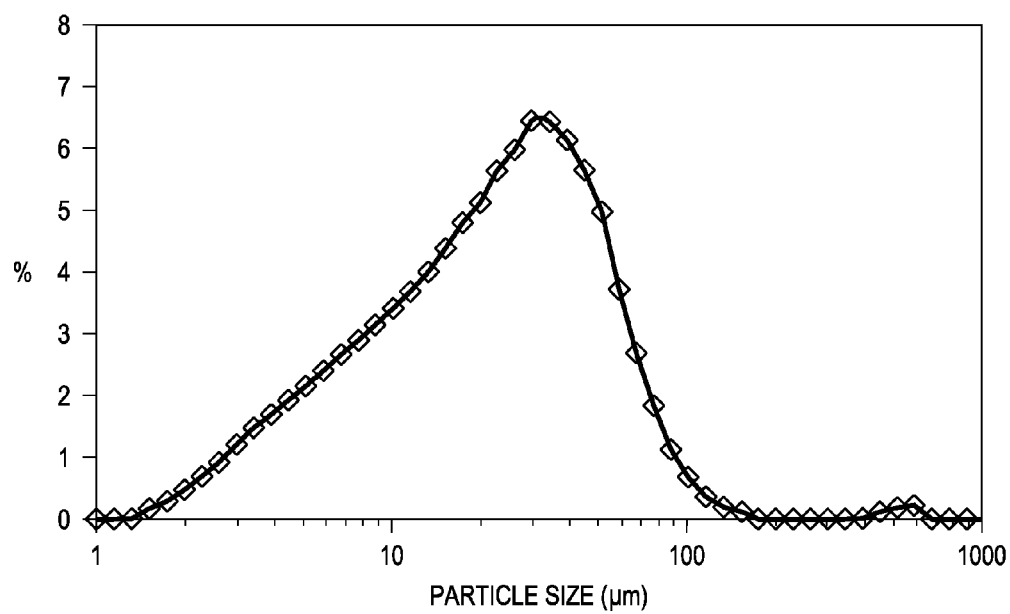
FIG. 5 depicts particle size distribution associated with Example 1 as further described herein.

In a first example, a two-gallon stirred autoclave reactor (exemplified in FIG. 4) was used to produce a low density inorganic material (e.g., as provided in step X). The reactor was initially filled with 2 kg tap water and warmed up to 70° C. A mixture of lime, clay, and silica was added to the reactor to form slurry with 8 wt % solids. The solids in the slurry included 21 wt % Ca(OH)$_2$, 73 wt % silica and 6 wt % bentonite clay. A representative particle size distribution for silica used with this example is shown in FIG. 5. The reactor was operated at a high stirring speed to maintain the solids in a suspended condition. The slurry was heated in the reactor to 173° C. at a saturated absolute steam pressure of 130 psi for 90 minutes followed by cooling to ambient temperature and pressure by passing tap water through an internal cooling coil of the reactor. A low density material comprising calcium silicate hydrate was formed in the reactor, providing a representative example of an inorganic material for surface treatment, as described herein. A sample of this slurry is referred to herein as samples A.

The slurry containing the low density material described above was decanted to provide a solids content of 15 wt %. Various amounts of a chemical agent, hydrolyzed n-octyltri-ethoxysilane, between 1 to 10% wt. (based on the dry mass of the low density material), were added to different samples of the slurry, which were used to proceed to the surface treatment step. For treatment of said surfaces, the different samples were each gently agitated at ambient temperature and pressure for 15 minutes and then maintained at the ambient condition without stirring for about 24 hours. The different samples are referred to herein as samples B, each of which comprised particles. Using a particle charge detector, such as a zeta potential meter, the surface electron charges of particles from samples B were found to be negative.

Samples B were used to proceed the activation step, in which an industrial quick lime (calcium oxide; herein, CaO) of 90 wt % purity was added to each sample at various amounts equivalent to 2-20 wt % of low density calcium silicate hydrates on a dry basis. The samples were then gently stirred at ambient temperature and pressure for approximately 2.5 hours. These samples are referred to herein as samples C.

Z-potential of representative particles from samples A, B and C were measured and are shown in TABLE 1. Z-potential measurement of the particles changed from negative (see samples B) to positive (see samples C) after the performing the reaction. Similar findings were observed when an alternative chemical agent was used, in which n-octyltriethoxysilane was replaced with potassium methyl siliconate.

TABLE 1

Representative properties of low density additives.

| Samples | Bulk density, kg/m$^3$ | Z-potential, mV |
|---------|------------------------|-----------------|
| A       | 190.4                  | −504            |
| B*      | 154.6                  | −433            |
| C**     | 179.2                  | +76             |

*n-octyltriethoxysilane used at 5 wt % of dry mass of A;
**n-octyltriethoxysilane used at 5 wt % of dry mass of A and CaO used at 5 wt % of dry mass of A.

Figure 6:
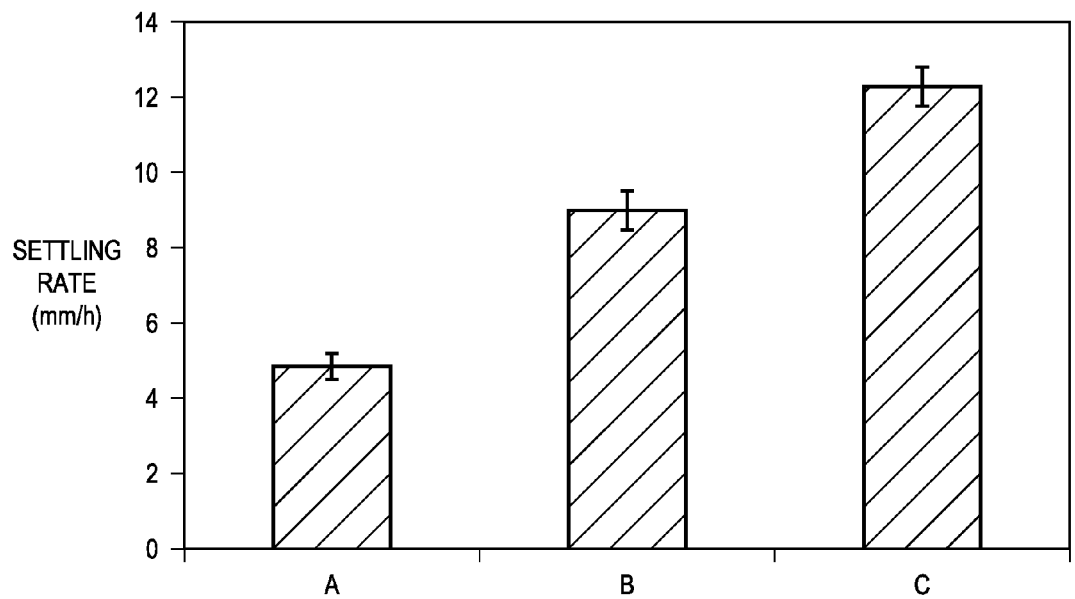
FIG. 6 depicts settling rate of a representative low density additive particles in a slurry.

Settling rates of samples A, B and C from TABLE 1 were also measured. Slurries of samples A, B and C were poured to the same height in three identical 500 mL cylinders. The slurries each had the same starting solids content and before settling were each stirred by a rubber pump. The solids settling rate was then determined by recording the solids levels in each cylinder over time. The settling rates of low density additive particles in such slurries are plotted in FIG. 6. From FIG. 6, settling rates of samples A, B and C, respectively, were found to be 4.91 mm/hour, 9.01 mm/hour and 12.36 mm/hour, respectively. Generally, the settling rate appeared to increase after surface treatment.

FIGS. 1 and 2 show representative images (optical and polished cross sectional, respectively) of a representative samples C. As previously described, the images show that structures of the particles described herein are highly porous.

In a second example, engineered low density additives described herein are incorporated into a composite material. Various fiber reinforced composites were made using a general formulation that was comprised of 11.0 wt % cellulose fiber, 46.8 wt % cement, 31.2 wt % silica, 2.0 wt % alumina tri-hydrate and 9.0 wt % of either a samples A, B or C, by dry basis. The composites formed from samples A, B or C are referred herein as samples A', B' and C', respectively. All formulations were mixed with water to form slurries of about 24 wt % solid. Slurries were then poured into filtered press molds to form pads having a diameter of 250 mm×250 mm×15 mm. The filtrated liquids/waters were collected and analyzed for amounts of lime. The pads were then kept at ambient temperature and pressure for about 12 hours and then put into an autoclave at 173° C. and 130 psi absolute saturated steam pressure for about 8 hours.

Figure 7:
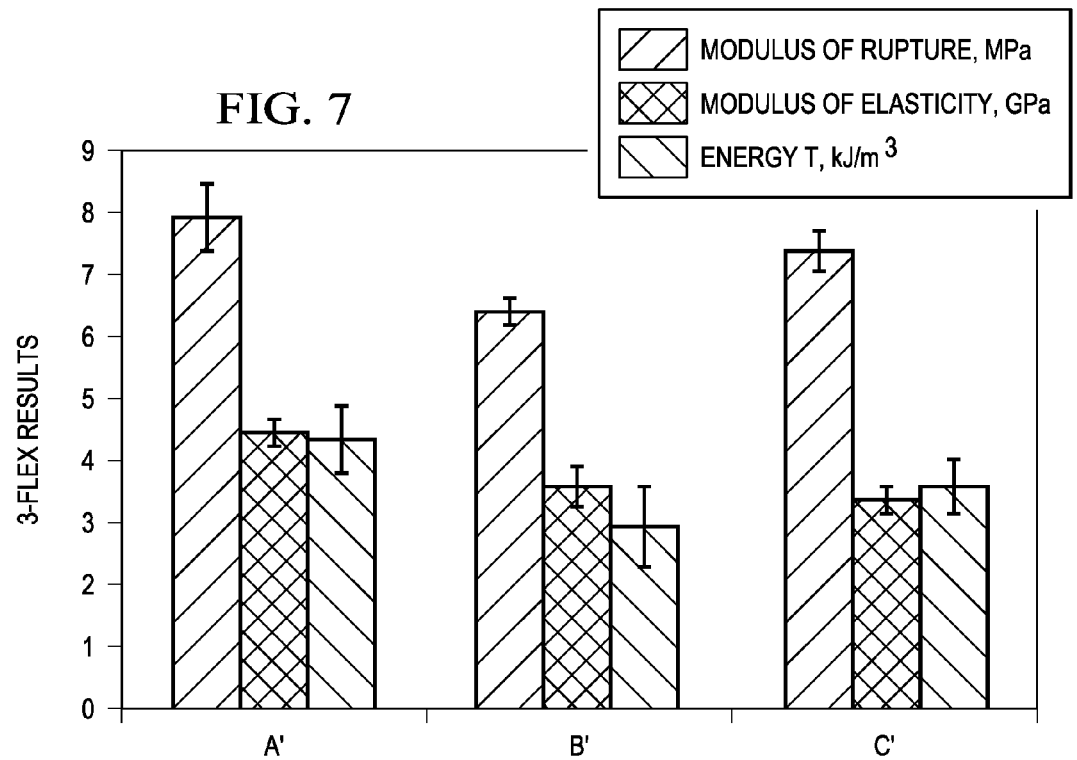
FIG. 7 depicts representative mechanical properties of composite materials that each have a different low density additive.

After autoclaving, all pads were cut into sized specimens. The mechanical properties, such as modulus of rupture (MOR) or modulus of elasticity (MOE) of the specimens were determined using the ASTM C 1185 test on specimens having dimensions of 240 mm×40 mm. A parameter measured by the area under the stress vs. strain curve from the start to the end of a sample rupture was also recorded to characterize specimen toughness. This parameter was measured through a three-point bending method with a span of 215 mm, and is referred to herein as Energy T. FIG. 7 showing saturated specimens illustrates that strength (reflected in a MOR value) and toughness (reflected in energy T value) of samples B' were lower than that of sample A', indicating that some strength and toughness loss may be due to a hydrophobic treatment of the surface. FIG. 7 also shows that strength and toughness values of samples B' were lower than that of samples C', indicating that strength and toughness loss through the hydrophobic surface treatment step was later regained through an activation step. As discussed previously, strength and toughness regains (for samples C') were generally due to a good bonding within the composite matrix as provided by the engineered low density additive described herein.

Figure 8:
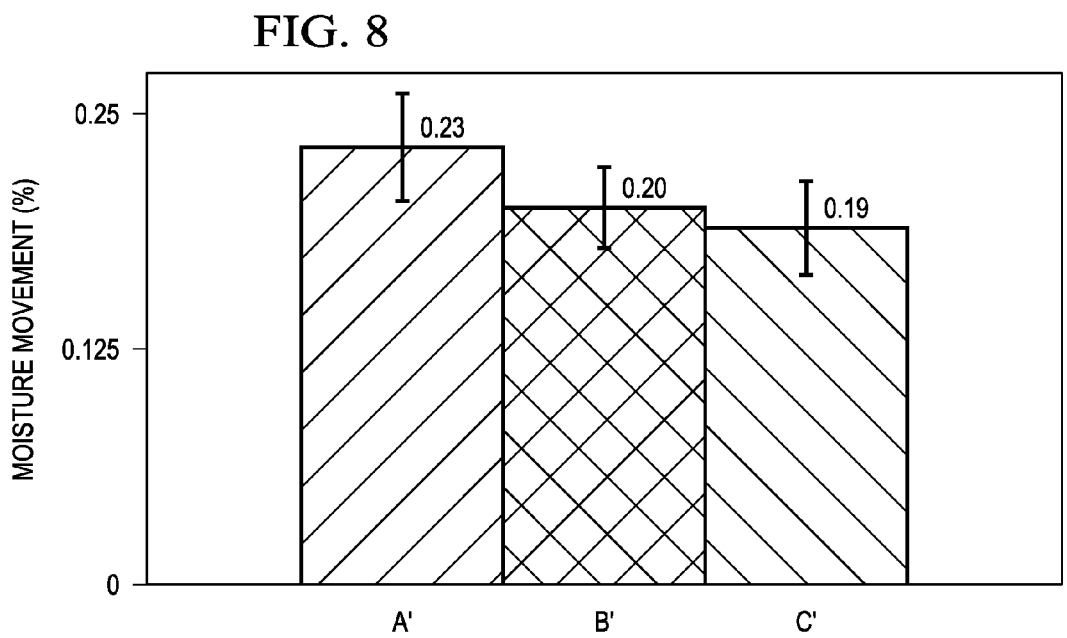
FIG. 8 depicts moisture movement of different composite materials each containing a different low density additive.
Figure 9:
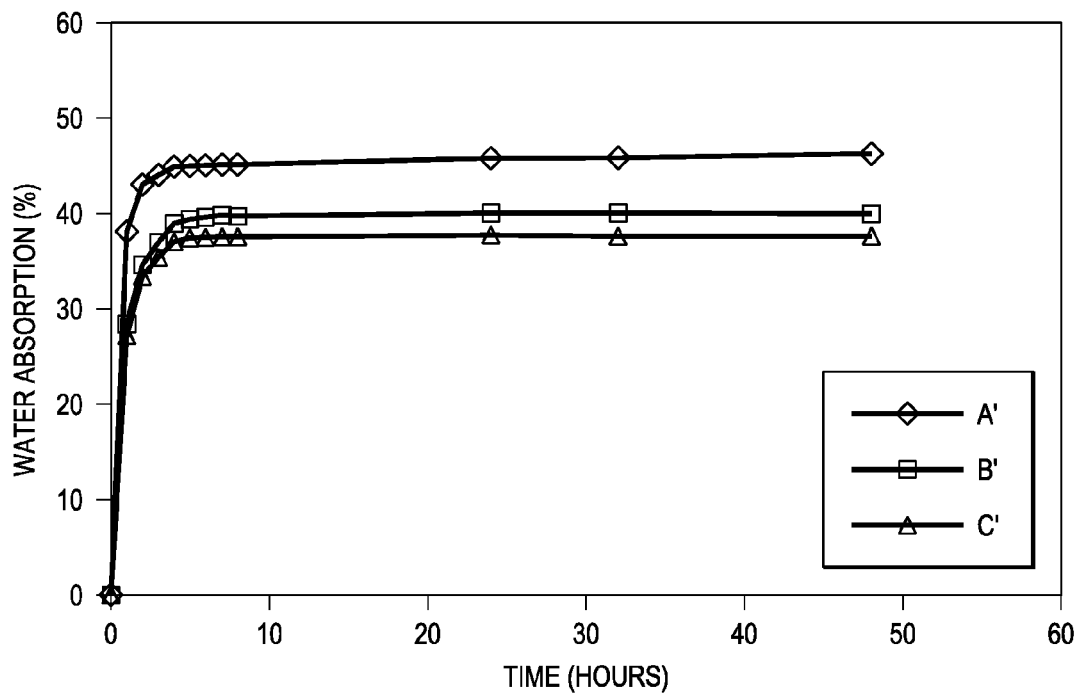
FIG. 9 depicts water adsorption capacity of different composite materials each containing a different low density additive.

Water adsorption capacity and moisture movement were examined by measuring the change over time in weight and length, respectively, of specimens immersed in water; samples were initially in a dry state and measured after saturation. FIG. 8 shows moisture movement in each specimen as indicated by a change in specimen length. The figure indicates that moisture movement of samples B' and C' are lower than that of samples A'. FIG. 9 shows the water absorption capacity of various specimens as indicated by a change in specimen weight. FIG. 9 shows water absorption in samples B' (squares) and C' (triangles) were 8.6 wt % and 6.3 wt % lower, respectively, than that of sample A' (diamond). FIGS. 8 and 9 show hydrophobic treatment (e.g., during the surface treatment step) reduces water movement and thus water absorption in a material (see samples B' and C' as compared with samples A').

Figure 10:
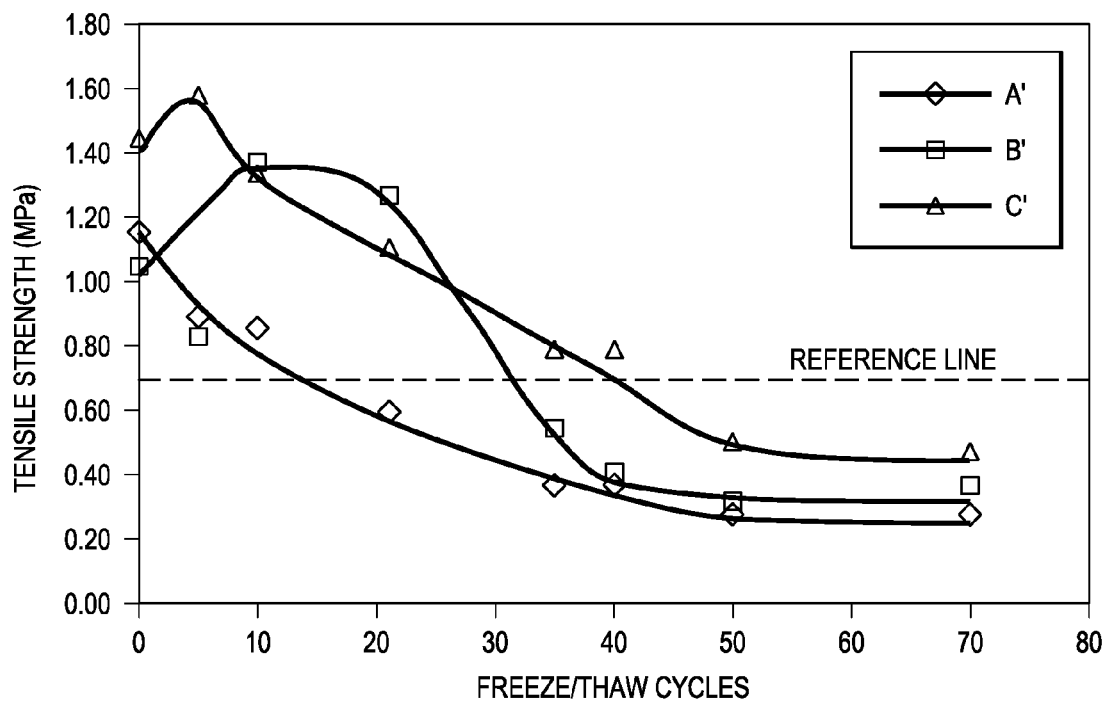
FIG. 10 depicts a comparison of treatment and tensile strength of composite articles as described herein.

A number of 44 mm×44 mm specimens were saturated with water to measure water absorption. These specimens were then positioned so that each was immersed in water to a particular depth and subjected to a cyclic freeze-thaw condition by cycling the environment temperature between −40° C. and 40° C. every 5 hours; one cycle included starting at ambient temperature and moving to −40° C. then to 40° C. and back to the ambient temperature. Tensile strength of each specimen was measured in the thickness direction after a number of cycles. FIG. 10 shows the tensile strength of such specimens, which illustrates that both a surface treatment step and an activation step improve tensile strength of a composite material undergoing cyclic freeze-thaw testing.

TABLE 2 represents the amounts of lime in the filtered liquid recovered from various formulations of samples A', B' and C'. The amount of calcium (Ca) in the filtered water of samples A' represents the amount that was normally present in the processed water of a conventional fiber reinforced cement formulation. TABLE 2 shows that the amounts of calcium in the filtered water did not increase in samples B' and C' as compared with that of sample A', indicating that lime remained with the additives rather than bleeding out after pressing.

TABLE 2

Representative content of Ca in the filtrated water from slurries comprising low density additives and differing amount of lime.

| Samples | % silane (in B) | % CaO (in C) | Ca content, mg/L |
|---------|-----------------|--------------|------------------|
| A'      | n/a             | n/a          | 1393             |
| B'      | 5               | n/a          | 1341             |
| C'      | 5               | 2.5          | 1255             |
| C'      | 5               | 5            | 1199             |
| C'      | 5               | 7.5          | 1226             |
| C'      | 5               | 10           | 1239             |

In a third example representative compounds are provided with an activation step to provide low density additives.

Figure 11:
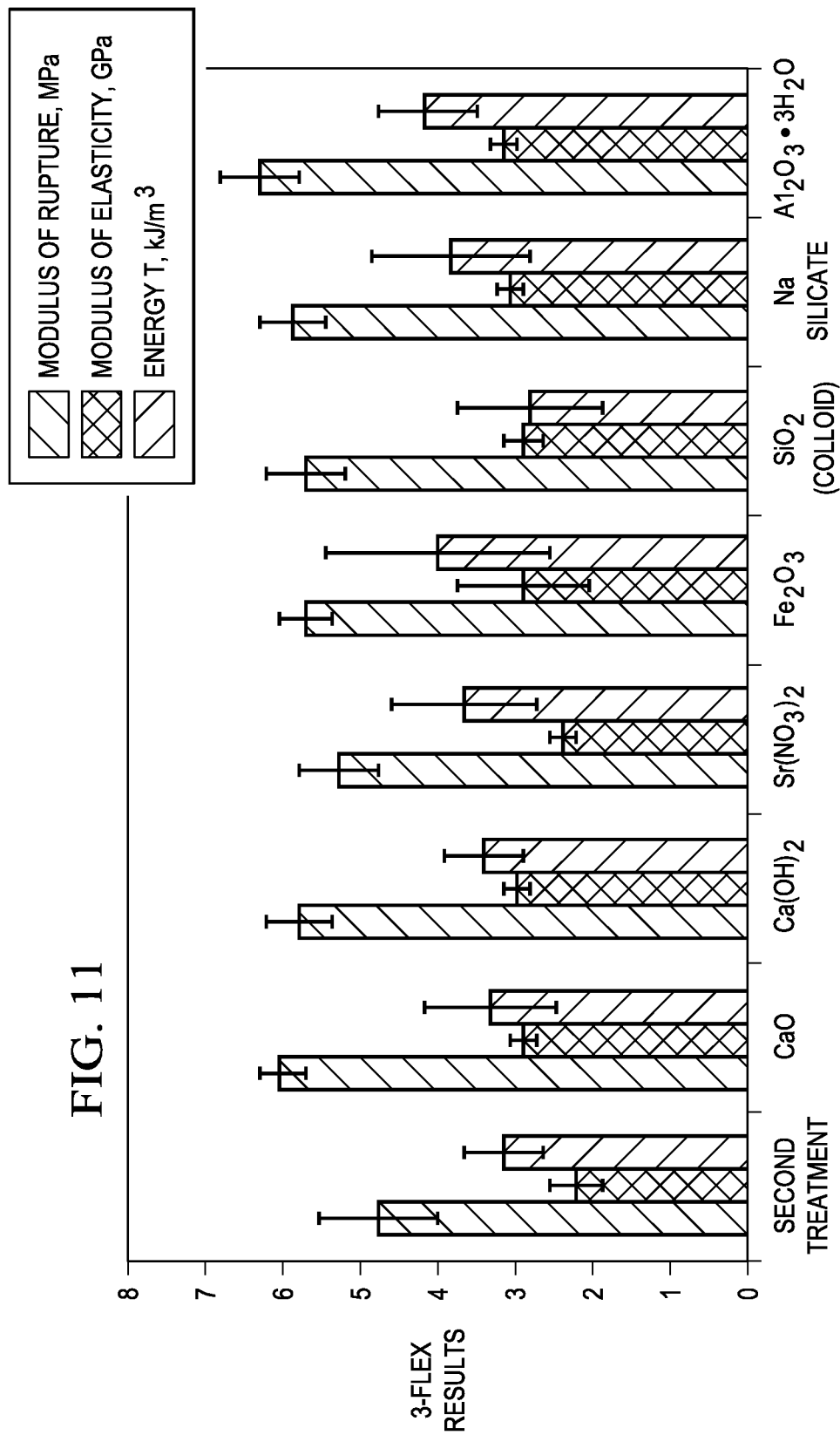
FIG. 11 depicts a comparison of treatment and mechanical properties of composite materials as described herein.

The preparation method of example 1 was used to prepare 7 different engineered low density additives, each having a different activation agent added with the activation step. The different agents were CaO, Ca(OH)$_2$ slurry at 20 wt % solid content, Al$_2$O$_3$.3H$_2$O, Sr(NO$_3$)$_2$, Fe$_2$O$_3$, colloidal SiO$_2$, and sodium silicate. Each engineered low density additive was then incorporated into a fiber reinforced formulation identified in example 2 to form 7 different fiber reinforced composite materials. Mechanical properties of each composite material were determined from such specimens as shown in FIG. 11. A composite material was also produced from a low density additive prepared from example 2 (without activation with an activation agent) and similarly evaluated, labeled as second treatment in FIG. 11. FIG. 11 illustrates that an activation step increased the MOR value of a composite material; values were higher for composites that had incorporated a low density additive that had undergone surface activation with an activation agent as compared with a composite specimen that has incorporated a low density additive and had not undergone activation with an activation agent described herein. As such, reaction with an activation agent improves characteristics of a low density additive and, thus, the strength (i.e., bending or compressive strength) of a fiber reinforced composite incorporating such a low density additive. Similar improvements were found for the Energy T value as shown in FIG. 11, indicating that an activation step also improved toughness of a fiber reinforced composite.

Figure 12:
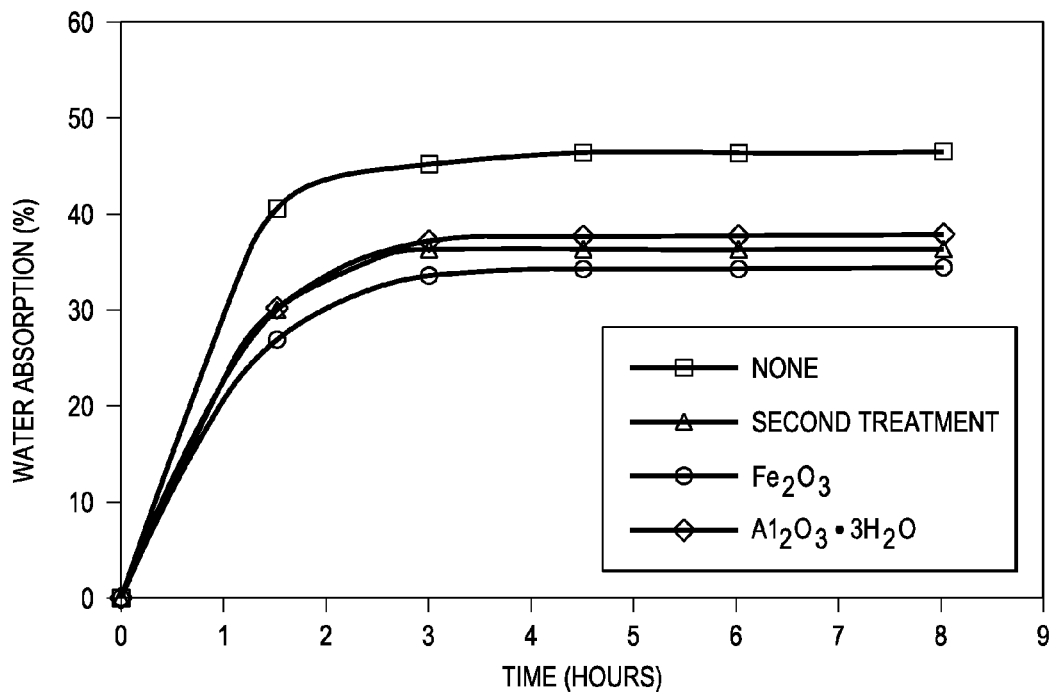
FIG. 12 depicts a comparison of treatment and water absorption of composite materials as described herein.

FIG. 12 shows water absorption behavior of some representative fiber composite specimens as prepared herewith. Water absorption behaviors of two additional fiber composites were also included for comparison, one incorporating low density calcium silicate hydrate additives as prepared in Example 1 without the second or third step treatments (labeled none; squares), and the other incorporating low density calcium silicate hydrate additives with only a second treatment (labeled second treatment; triangles). As can be seen from this figure, a second treatment significantly reduced water ingress in fiber reinforced composites. An additional treatment (e.g., iron oxide or aluminum oxide) did not appear to significantly effect water absorption behavior of the composite.

In a fourth example, preparation of additives described herein in view of various amounts of an other activation agents are reviewed as well as the mechanical properties of such composite materials that incorporated such additives.

Figure 13:
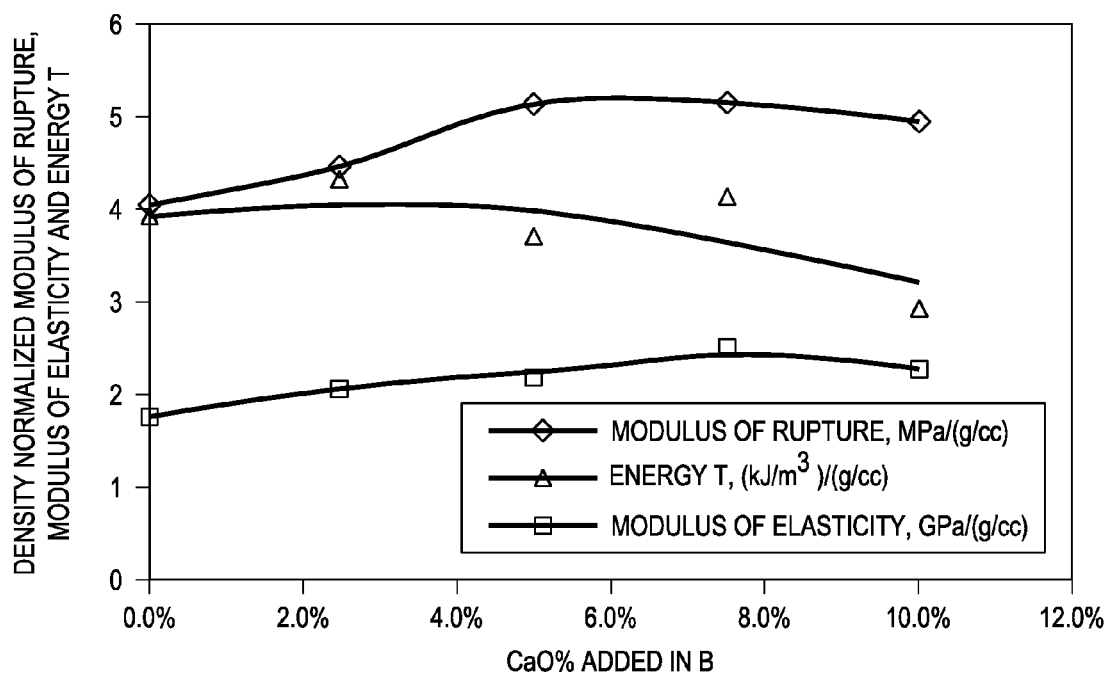
FIG. 13 depicts a comparison of CaO and mechanical properties of composite materials described herein.

The same method of example 1 for preparing various samples of engineered low density additives was used; CaO was then provided as an activation agent for the activation step. The amount of CaO ranged from 0 to 10 wt % of the low density additive on a dry weight basis (weight being that before treatment). Additives in which 0 wt % of CaO was added were used in a comparative sample in which no activation step occurred. Low density additives (treated and untreated) were incorporated into fiber reinforced formulations in the same way as described in example 2. The strength, represented by the MOR value, of each fiber reinforced composite was determined and is presented in FIG. 13. This figure shows that the mechanical strength of the composite material increased for all the samples having a third step treatment.

In a fifth example, still further additives were prepared with and without an activation step, at either an ambient or an elevated temperature and incorporated into composite materials, specimens of which were evaluated for their mechanical properties.

Figure 14:
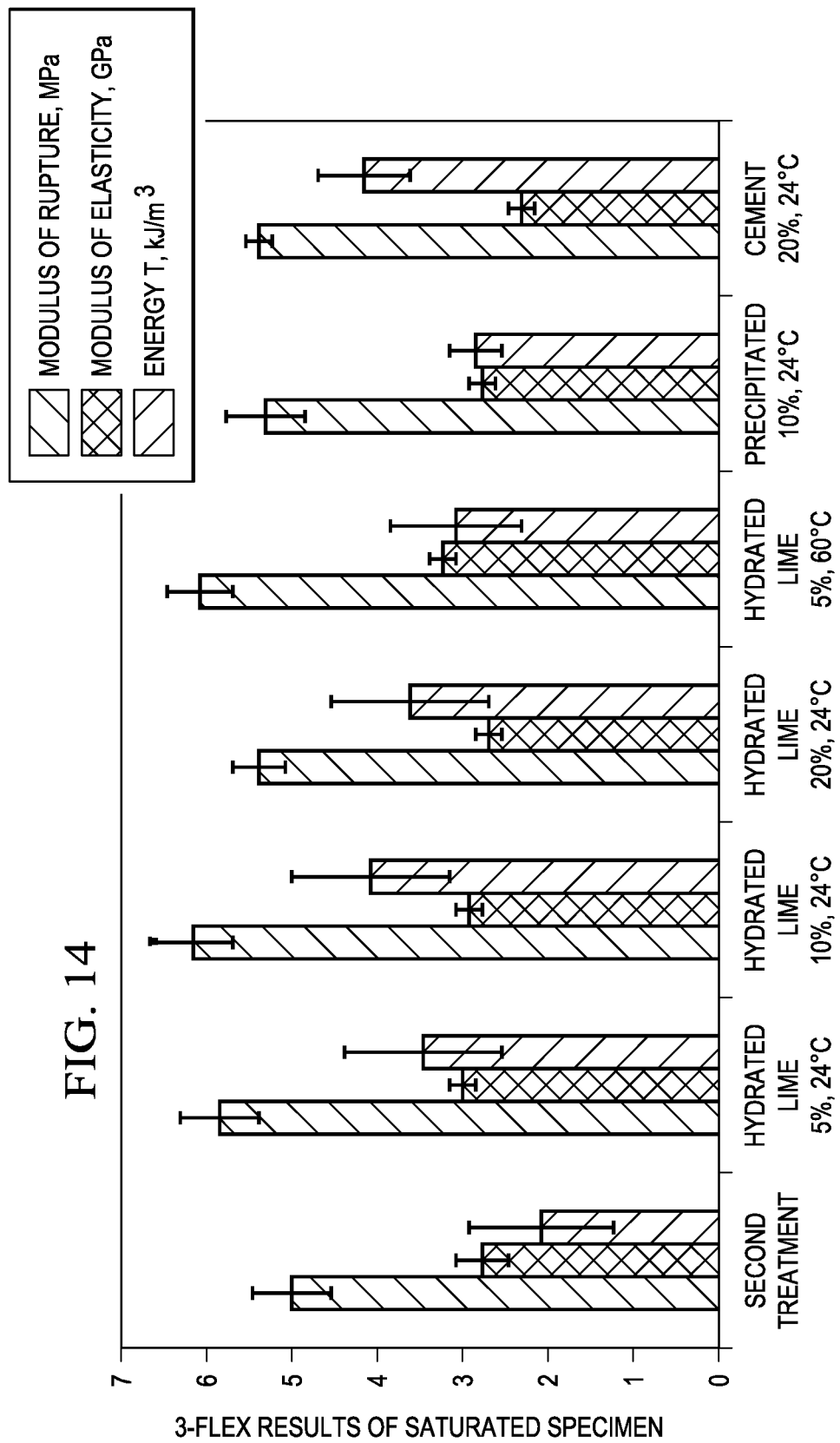
FIG. 14 depicts a comparison of treatment and mechanical properties of composite materials as described herein.

Here, similar to that described with the fourth example, various low density additive samples were prepared in which hydrated lime, ranging from 0 to 20 wt % on dry basis, was provided as the activation agent for the activation step. The hydrated lime was provided in a slurry form with about 20 wt % solids. The activation step was carried out at 24° C. for all samples, except one, which was prepared at 60° C. Additives in which 0 wt % of hydrated lime was added was used as a comparative sample in which no activation step occurred (see second treatment). Mechanical properties of each specimen are presented in FIG. 14. FIG. 14 shows improved mechanical strength and toughness for all formed samples into which an additive as described herein was incorporated. Temperature of the activation step also appeared to effect mechanical strength and toughness; samples treated at a higher temperature (60° C.) had a higher strength but lower toughness than those treated at the temperature of 24° C.

In a sixth example, further additives were prepared with and without an activation step and incorporated into composite materials, specimens of which were evaluated for their mechanical properties.

Figure 15:
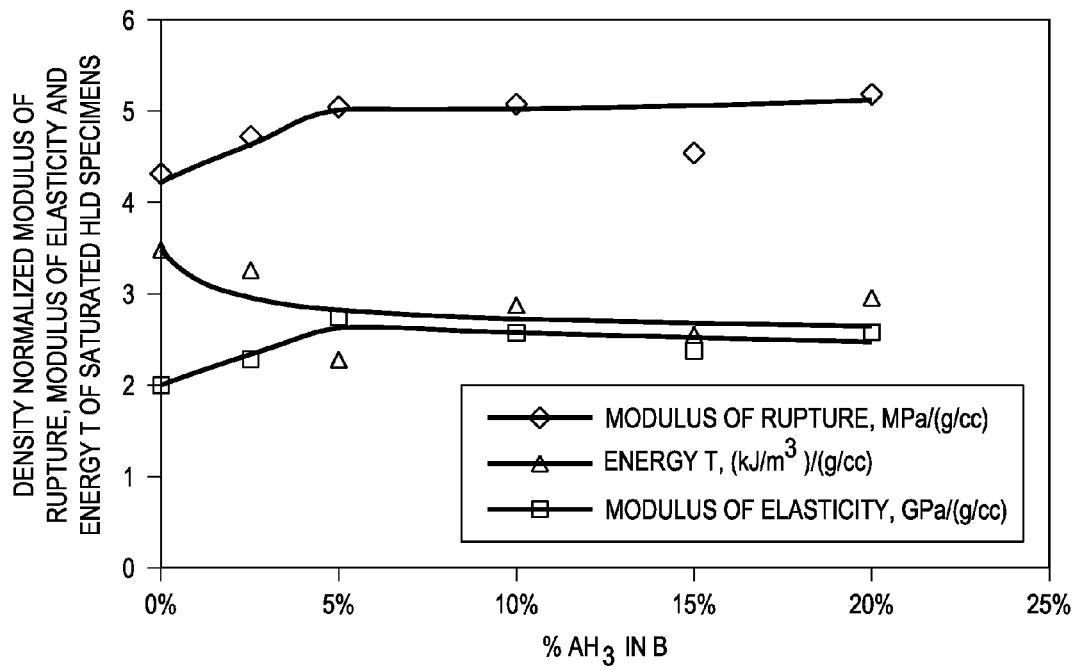
FIG. 15 depicts a comparison of Al$_2$O$_3$.3H$_2$O (herein, AH$_3$) and mechanical properties of composite materials as described herein.

Similar to the fourth example, low density additives were prepared using a method similar to that of example 1 after which some of the additives were further activated with an activation agent of alumina trihydrate ($Al_2O_3 \cdot 3H_2O$) provided at varying amounts, ranging from 0 to 20 wt % on a dry basis. Additives were incorporated into composite formulations and specimens from each formulation were prepared and evaluated for strength, represented by MOR value as depicted in FIG. 15. FIG. 15 shows that mechanical strength improved for a composite material incorporating low density additives that had undergone activation with alumina trihydrate.

Figure 16:
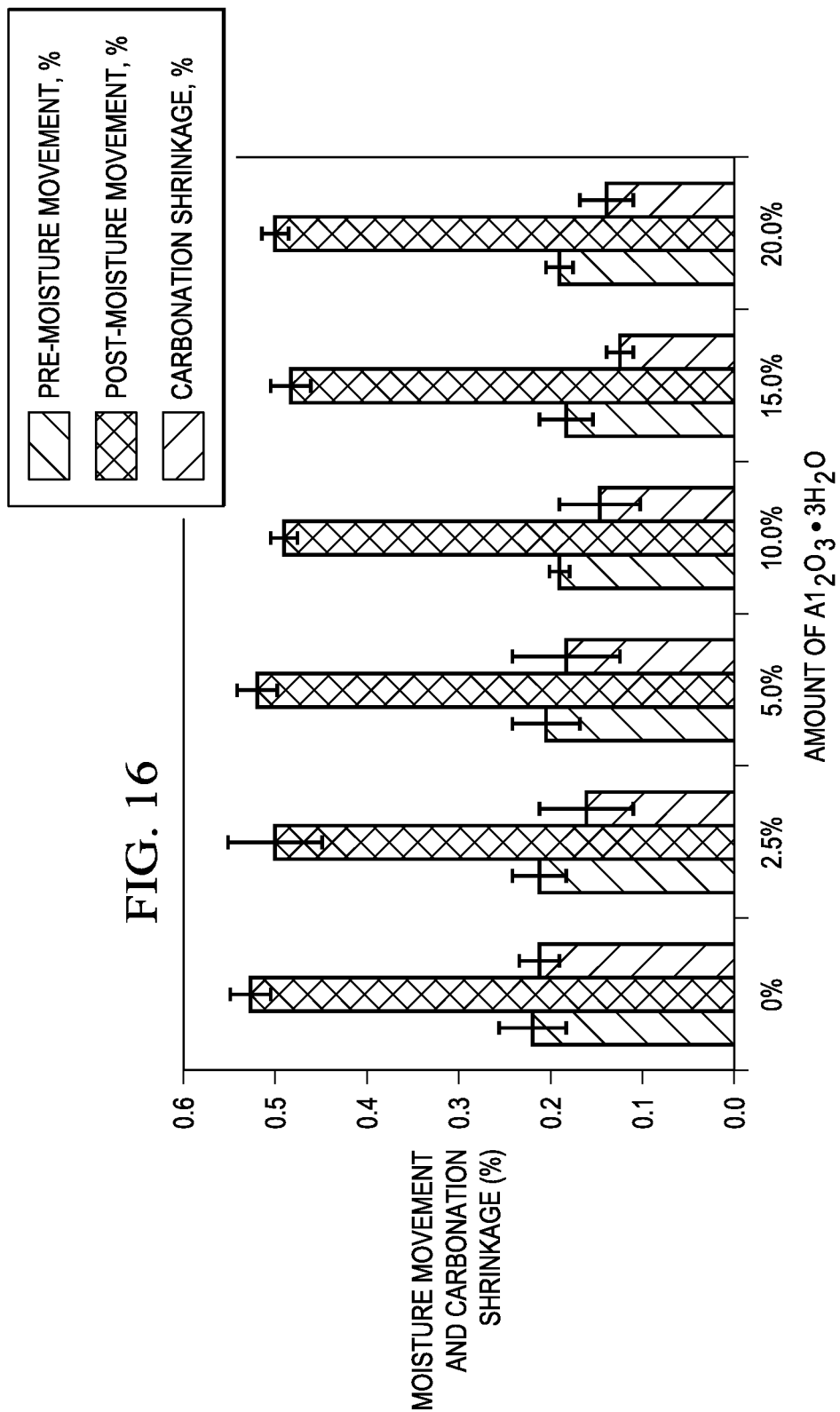
FIG. 16 depicts a comparison of Al$_2$O$_3$.3H$_2$O (herein, AH$_3$) and moisture movement of composite materials as described herein.

Further specimens from the composite formulations (as depicted in FIG. 15) were immersed in water for about 24 hours at ambient temperature, then placed in a pure $CO_2$ atmosphere with 10% humidity and then dried in a forced draft oven at an elevated temperature for about 19 hours. The dimensions of these specimens before and after water immersion were taken and are shown in FIG. 16. Carbonation shrinkage data for each specimen is also shown in FIG. 16. FIG. 16 illustrates that an activation treatment of low density additives as described herein reduces moisture movement and carbonation shrinkage of a composite material containing such additives. Reductions in moisture movement and carbonation shrinkage are indications of improved dimensional stability and, thus, moisture performance of a composite material is improved when the composite material has additives treated as described herein.

In a seventh example, preparation methods for forming low density additives described herein are reviewed, particularly in view of how such methods effect setting and hardening of a composite matrix incorporating such additives.

Three fiber reinforced composite materials were prepared, a first composite incorporated a low density calcium silicate hydrate. A second and third composite each incorporated an engineered low density additive described herein. The engineered low density additive was a low density calcium silicate hydrate surface treated with 4 wt % silane at room temperature followed by a second treatment with 10 wt % hydrated lime at 60° C. In the second composite, the engineered low density additives were incorporated in a slurry form with a 17.65 wt % solid content. In the third composite, the engineered low density additives were in an oven-dried powder form when incorporated into the composite material. The composite formulation generally included 48.6 wt % cement, 31 wt % ground silica sand, 9 wt % cellulose fiber, 1.4 wt % viscosity enhancing agent and 10 wt % low density additives on a dry basis. The formulations were prepared in a paste form at 40 wt % solids. The pastes were then shaped into cylinders of 73 mm diameter×40 mm height.

Figure 17:
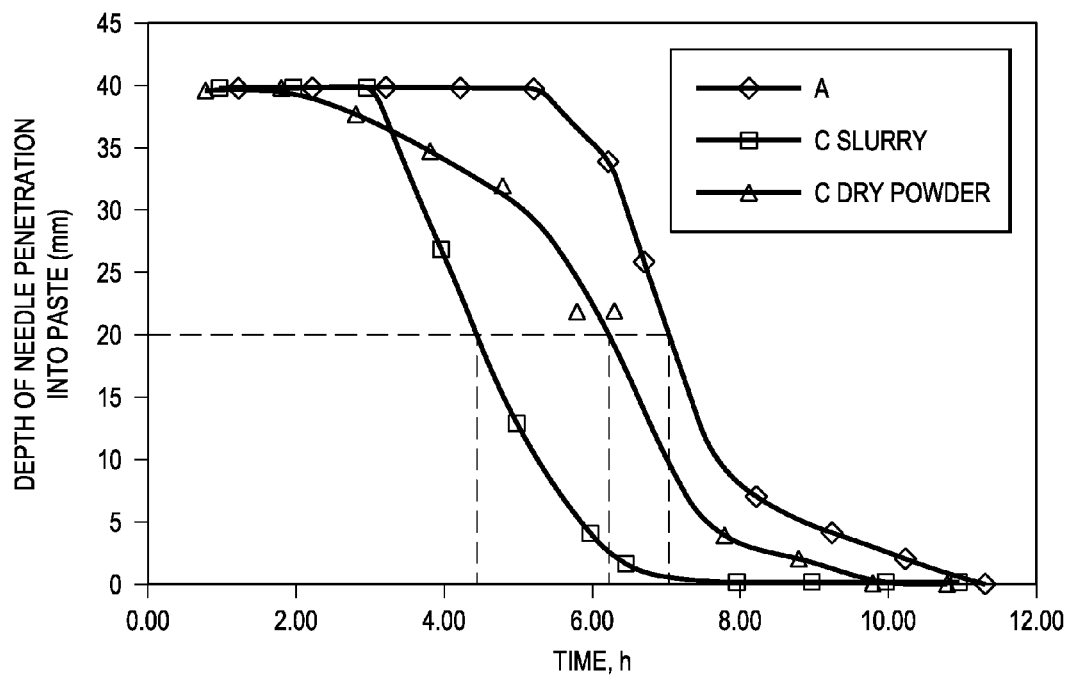
FIG. 17 depicts a comparison of mechanical properties of composite materials, slurries and a dry powders.

The hardness of each fiber reinforced composite paste formed as described above were monitored over time using a needling method according to ASTM C191. The hardness was quantified by a depth of needle penetration into the shaped cylinder. Hardness results are provided in FIG. 17, showing that at 50% depth penetration, composites having the engineered low density additives that were treated as described herein were able to set faster, on the order of 2 to 2.5 hours faster, than the composite which incorporated an alternative additive (i.e., untreated calcium silicate hydrate). As such, the engineered low density additives described herein may further and advantageously accelerate setting and hardening of a hardenable composite when it is desirable.

As described, materials described herein offer only very low moisture movement and undergo little moisture absorption and retention. Such properties are, in part, from a high surface reactivity that allows superior bonding of components within the matrix. Articles and products produced as described herein have improved moisture performance that translates to a more durable article or product than already available.

Although the foregoing description of certain preferred embodiments has shown, described and pointed out the fundamental novel features of the invention, it will be understood that various omissions, substitutions, and changes in the form of the detail of the invention as illustrated as well as the uses thereof, may be made by those skilled in the art, without departing from the described invention. Consequently, the scope of the invention should not be limited to the foregoing discussions.

What is claimed is:

1. A low density additive comprising particles of a low density inorganic material having a plurality of pores thereby forming a porous structure, wherein each particle comprises synthetic hydrophobic and reactive sites, said synthetic hydrophobic sites comprise one or more hydrocarbon chains deposited within the pores and oriented to repel water, said synthetic reactive sites comprise an activation agent synthetically deposited on the surface of the porous structure to improve reactivity in a cementitious matrix, wherein the activation agents is selected from the group consisting of aluminum powder, quick lime, hydrated lime, and sodium silicate, said particles being 0.1 μm to 15 mm in size and the low density additive having a positive zeta potential and a bulk density of 60 to 1000 kg/m³.

2. The low density additive of claim 1, wherein the hydrophobic sites are formed by a surface treatment using a compound selected from the group consisting of a silane, siloxane, or siliconate, and combinations thereof.

3. The low density additive of claim 1, further comprising hydroxyl groups, wherein the hydroxyl groups are deposited by an activation agent selected from the group consisting of an oxide, hydroxide, organic salt or inorganic salt of a chemical and its derivative from periods 1a, 2a, 3a and 4a of the periodic table.

4. The low density additive of claim 1, wherein the low density additive is an additive in a composite formulation comprising cellulose fiber, cement, and silica.

* * * * *